(12) United States Patent
Qiu

(10) Patent No.: US 10,872,455 B2
(45) Date of Patent: *Dec. 22, 2020

(54) METHOD AND PORTABLE ELECTRONIC DEVICE FOR CHANGING GRAPHICS PROCESSING RESOLUTION ACCORDING TO SCENARIO

(71) Applicant: HUAWEI TECHNOLOGIES CO., LTD., Guangdong (CN)

(72) Inventor: Jianbin Qiu, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/717,935

(22) Filed: Dec. 17, 2019

(65) Prior Publication Data

US 2020/0211254 A1 Jul. 2, 2020

Related U.S. Application Data

(63) Continuation of application No. 15/780,687, filed as application No. PCT/CN2015/096363 on Dec. 3, 2015, now Pat. No. 10,510,175.

(51) Int. Cl.
*G06T 1/20* (2006.01)
*G06T 15/00* (2011.01)
(Continued)

(52) U.S. Cl.
CPC .......... *G06T 15/005* (2013.01); *G06F 1/3203* (2013.01); *G06F 1/3265* (2013.01);
(Continued)

(58) Field of Classification Search
None
See application file for complete search history.

(56) References Cited

U.S. PATENT DOCUMENTS

| | | | |
|---|---|---|---|
| 10,510,175 B2 | 12/2019 | Qiu | |
| 2002/0126115 A1 | 9/2002 | Ijntema | |

(Continued)

FOREIGN PATENT DOCUMENTS

| | | |
|---|---|---|
| CN | 102682744 | 9/2012 |
| CN | 103179284 | 6/2013 |

(Continued)

OTHER PUBLICATIONS

Office Action issued in Chinese Application No. 201580085073.8 dated Dec. 3, 2019, 6 pages.

(Continued)

*Primary Examiner* — Joni Hsu
(74) *Attorney, Agent, or Firm* — Fish & Richardson P.C.

(57) ABSTRACT

The present invention provides a method for changing graphics processing resolution according to a scenario, including: determining a first display scenario as a scenario in which energy can be saved; reducing graphics processing resolution of a graphics processing unit; rendering, by the graphics processing unit, at least one target graphics frame in the first display scenario according to the reduced graphics processing resolution, to obtain at least one target image frame; adapting the at least one target image frame according to screen display resolution; and displaying the at least one target image frame adapted. The present invention further provides a portable electronic device for changing graphics processing resolution according to a scenario.

8 Claims, 9 Drawing Sheets

(51) Int. Cl.
  *G06F 1/3203*  (2019.01)
  *G09G 5/391*  (2006.01)
  *G06F 1/3234*  (2019.01)
  *G06T 15/02*  (2011.01)

(52) U.S. Cl.
  CPC .............. *G06T 1/20* (2013.01); *G06T 15/00* (2013.01); *G06T 15/02* (2013.01); *G09G 5/391* (2013.01); *G06T 2200/28* (2013.01); *Y02D 10/153* (2018.01)

(56) References Cited

U.S. PATENT DOCUMENTS

| | | |
|---|---|---|
| 2003/0128198 A1 | 7/2003 | Mizuyabu et al. |
| 2008/0122835 A1 | 5/2008 | Falco |
| 2008/0143760 A1 | 6/2008 | Ellis et al. |
| 2009/0324118 A1 | 12/2009 | Maslov et al. |
| 2012/0258699 A1 | 10/2012 | Kim et al. |
| 2013/0088500 A1 | 4/2013 | Niederauer et al. |
| 2013/0120409 A1 | 5/2013 | Iwase et al. |
| 2013/0128198 A1 | 5/2013 | Shibazaki |
| 2013/0176322 A1 | 7/2013 | Reuven et al. |
| 2014/0184626 A1 | 7/2014 | Narayanan et al. |
| 2014/0289423 A1* | 9/2014 | Kim ................. H04N 21/44227 709/233 |

FOREIGN PATENT DOCUMENTS

| | | |
|---|---|---|
| CN | 103501418 | 1/2014 |
| CN | 103559151 | 2/2014 |
| CN | 103778656 | 5/2014 |
| CN | 104981766 | 10/2014 |
| CN | 104618817 | 5/2015 |
| CN | 104679509 | 6/2015 |
| CN | 105744252 A | 7/2016 |
| JP | 2001502077 | 2/2001 |
| JP | 2007179225 | 7/2007 |
| JP | 2010513956 | 4/2010 |
| JP | 2013062731 | 4/2013 |
| JP | 2013516697 | 5/2013 |
| KR | 20090087505 A | 8/2009 |
| WO | 2015120778 | 8/2015 |

OTHER PUBLICATIONS

Search Report issued in Chinese Application No. 201580085073.8 dated Nov. 25, 2019, 3 pages.
Extended European Search Report issued in European Application No. 15909533.0 dated Oct. 9, 2018, 8 pages.
International Search Report and Written Opinion issued in International Application No. PCT/CN2015/096363 dated Jun. 20, 2016, 23 pages.
Office Action issued in Japanese Application No. 2018-528567 dated Aug. 20, 2019, 8 pages (With English Translation).
Office Action issued in Korean Application No. 2018-7018248 dated Feb. 24, 2020, 7 pages (with English translation).
Office Action issued in Chinese Application No. 201580085073.8 dated Jun. 9, 2020, 17 pages (with English translation).

* cited by examiner

METHOD AND PORTABLE ELECTRONIC DEVICE FOR CHANGING GRAPHICS PROCESSING RESOLUTION ACCORDING TO SCENARIO

CROSS-REFERENCE TO RELATED APPLICATIONS

This application is a continuation of U.S. patent application Ser. No. 15/780,687, filed on Jun. 1, 2018, now issued as U.S. Pat. No. 10,510,175 on Dec. 17, 2019, which is a National Stage of International Application No. PCT/CN2015/096363 filed on Dec. 3, 2015, which applications are hereby incorporated by reference in their entireties.

TECHNICAL FIELD

The present invention relates to the field of electronic technologies, and in particular, to a method and a system for changing graphics processing resolution according to a scenario.

BACKGROUND

Currently, a graphics processing capability of a portable electronic device (portable electronic device) is becoming stronger, and large 3D applications such as 3D games are more widely used in the portable electronic device. The applications need to heavily use a graphics processing unit (Graphical Processing Unit, GPU) for calculation.

The GPU is a parallel computing unit that specially processes vectors, and runs in a pipeline manner. A 3D application transfers 3D model data and map data to the GPU. The GPU completes fixed point positioning, combination, and shading, that is, connects vertices to form fragments and then completes complex computing such as rendering.

Complexity of a 3D model is one of key factors that determine GPU power consumption. In a 3D game, there are usually more than ten thousand vertices in a picture of the 3D game, and the vertices form thousands of fragments. Inside each fragment, a color of each displayable pixel needs to be calculated point by point, thereby consuming large power.

How to reduce power consumption of a GPU in processing a 3D application is an urgent problem of the portable electronic device currently.

SUMMARY

Embodiments of the present invention provide a method and a portable electronic device for changing display resolution according to a scenario, to reduce power consumption of a GPU in processing a 3D application.

An embodiment of the present invention provides a method for changing graphics processing resolution according to a scenario, including:

determining a first display scenario as a scenario in which energy can be saved;

reducing graphics processing resolution of a graphics processing unit;

rendering, by the graphics processing unit, at least one target graphics frame in the first display scenario according to the reduced graphics processing resolution, to obtain at least one target image frame;

adapting the at least one target image frame according to screen display resolution; and displaying the at least one target image frame adapted.

Optionally, the determining a first display scenario as a scenario in which energy can be saved includes:

obtaining a first graphics frame sequence in the first display scenario;

calculating an eigenvalue of the first graphics frame sequence; and determining a display scenario type of the first graphics frame sequence according to the eigenvalue of the first graphics frame sequence, where the display scenario type includes a scenario in which a game is being played or a scenario in which no game is being played, and the scenario in which a game is being played is a scenario in which energy can be saved.

Optionally, in the method, the first graphics frame in the first model sequence is used as a first target graphics frame in the first graphics frame sequence to calculate an eigenvalue of the first target graphics frame, and the eigenvalue of the first target graphics frame is used as the eigenvalue of the first graphics frame sequence.

The calculating an eigenvalue of the first graphics frame sequence includes at least one of the following steps:

calculating a thread eigenvalue of the first target graphics frame according to a thread required for rendering the first target graphics frame;

calculating a model eigenvalue of the first target graphics frame according to a model array of the first target graphics frame;

calculating an address eigenvalue of the first target frame according to a buffer address of a model included in the first target graphics frame; and performing weighted summation on the thread eigenvalue, the model eigenvalue, and the address eigenvalue, to obtain the eigenvalue of the first target graphics frame.

Optionally, the determining a to-be-displayed display scenario as a scenario in which energy can be saved includes:

obtaining a first graphics frame sequence in the first display scenario;

calculating an eigenvalue of the first graphics frame sequence; and determining a display scenario type of the first graphics frame sequence according to the eigenvalue of the first graphics frame sequence, where the display scenario type includes a rapidly changing scenario or a slowly changing scenario, and the rapidly changing scenario is a scenario in which energy can be saved.

Optionally, the determining a current display scenario as a scenario in which energy can be saved includes:

when a quantity of control instructions received in the first display scenario within first time is greater than a first threshold, determining the first display scenario as a scenario in which energy can be saved.

Optionally, the rendering, by the graphics processing unit, at least one graphics frame in the first display scenario according to the reduced graphics processing resolution includes:

setting a graphics processing global variable of the graphics processing unit according to the reduced graphics processing resolution; and rendering the at least one target graphics frame according to the graphics processing global variable.

Optionally, after the displaying the at least one target image frame adapted, the method further includes:

collecting a quantity of times that a user exits an application program after the at least one target image frame is displayed, where the application program is an application program that generates the first graphics frame sequence; and when the quantity of times is greater than a tolerance threshold, stopping executing the method provided in this embodiment of the present invention.

Another embodiment of the present invention provides a portable electronic device, including:

a determining unit, configured to determine a first display scenario as a scenario in which energy can be saved;

a reduction unit, configured to reduce graphics processing resolution of a graphics processing unit;

the graphics processing unit, configured to render at least one target graphics frame in the first display scenario according to the reduced graphics processing resolution, to obtain at least one target image frame;

an adaptation unit, configured to adapt the at least one target image frame according to screen display resolution; and a display unit, configured to display the at least one target image frame adapted.

Optionally, the determining unit includes:

an obtaining module, configured to obtain a first graphics frame sequence in the first display scenario;

a calculation module, configured to calculate an eigenvalue of the first graphics frame sequence; and a determining module, configured to determine a display scenario type of the first graphics frame sequence according to the eigenvalue of the first graphics frame sequence, where the display scenario type includes a scenario in which a game is being played or a scenario in which no game is being played, and the scenario in which a game is being played is a scenario in which energy can be saved.

Optionally, the determining unit includes:

an obtaining module, configured to obtain a first graphics frame sequence in the first display scenario;

a calculation module, configured to calculate an eigenvalue of the first graphics frame sequence; and a determining module, configured to determine a display scenario type of the first graphics frame sequence according to the eigenvalue of the first graphics frame sequence, where the display scenario type includes a rapidly changing scenario or a slowly changing scenario, and the rapidly changing scenario is a scenario in which energy can be saved.

Optionally, the determining unit is specifically configured to:

when a quantity of control instructions received in the first display scenario within first time is greater than a first threshold, determine the first display scenario as a scenario in which energy can be saved.

Optionally, the graphics processing unit includes:

a global variable setting module, configured to set a graphics processing global variable of the graphics processing unit according to the reduced graphics processing resolution; and a rendering module, configured to render the at least one target graphics frame according to the graphics processing global variable.

Optionally, the portable electronic device further includes:

an enabling module, configured to enable or disable the determining module by using a hardware switch or a soft switch.

Optionally, the enabling module is specifically configured to:

collect a quantity of times that a user exits an application program after the display module displays the at least one target image frame, where the application program is an application program that generates the first graphics frame sequence; and disable the determining module when the quantity of times is greater than a tolerance threshold.

Still another embodiment of the present invention provides a portable electronic device, including a central processing unit, a graphics processing unit, a display adapter circuit, and a display.

The central processing unit is configured to determine a first display scenario as a scenario in which energy can be saved, and reduce graphics processing resolution of the graphics processing unit.

The graphics processing unit is configured to render at least one target graphics frame in the first display scenario according to the reduced graphics processing resolution, to obtain at least one target image frame.

The display adapter circuit is configured to adapt the at least one target image frame according to display resolution of the display.

The display is configured to display the at least one target image frame adapted.

Optionally, the determining a first display scenario as a scenario in which energy can be saved includes:

obtaining a first graphics frame sequence in the first display scenario;

calculating an eigenvalue of the first graphics frame sequence; and determining a display scenario type of the first graphics frame sequence according to the eigenvalue of the first graphics frame sequence, where the display scenario type includes a scenario in which a game is being played or a scenario in which no game is being played, and the scenario in which a game is being played is a scenario in which energy can be saved.

Optionally, the first graphics frame in the first model sequence is used as a first target graphics frame in the first graphics frame sequence to calculate an eigenvalue of the first target graphics frame, and the eigenvalue of the first target graphics frame is used as the eigenvalue of the first graphics frame sequence.

The calculating an eigenvalue of the first graphics frame sequence includes at least one of the following steps:

calculating a thread eigenvalue of the first target graphics frame according to a thread required for rendering the first target graphics frame;

calculating a model eigenvalue of the first target graphics frame according to a model array of the first target graphics frame;

calculating an address eigenvalue of the first target frame according to a buffer address of a model included in the first target graphics frame; and performing weighted summation on the thread eigenvalue, the model eigenvalue, and the address eigenvalue, to obtain the eigenvalue of the first target graphics frame.

Optionally, the determining a to-be-displayed display scenario as a scenario in which energy can be saved includes:

obtaining a first graphics frame sequence in the first display scenario;

calculating an eigenvalue of the first graphics frame sequence; and determining a display scenario type of the first graphics frame sequence according to the eigenvalue of the first graphics frame sequence, where the display scenario type includes a rapidly changing scenario or a slowly changing scenario, and the rapidly changing scenario is a scenario in which energy can be saved.

Optionally, the determining a current display scenario as a scenario in which energy can be saved includes:

when a quantity of control instructions received in the first display scenario within first time is greater than a first threshold, determining the first display scenario as a scenario in which energy can be saved.

Optionally, the graphics processing unit includes:

a global variable setting module, configured to set a graphics processing global variable of the graphics processing unit according to the reduced graphics processing resolution; and a rendering module, configured to render the at least one target graphics frame according to the graphics processing global variable.

Optionally, the determining a first display scenario as a scenario in which energy can be saved includes:

determining, according to the enabling instruction, the first display scenario as a scenario in which energy can be saved, where the enabling instruction is used to enable or stop an operation of determining the first display scenario as a scenario in which energy can be saved;

the central processing unit is further configured to collect a quantity of times that a user exits an application program after the display displays the at least one target image frame adapted, where the application program is an application program that generates the first graphics frame; and when the quantity of times is greater than a tolerance threshold, an enabling instruction used to stop executing the operation of determining the first display scenario as a scenario in which energy can be saved is generated.

By means of the method and the portable electronic device provided in the embodiments of the present invention, power consumption of a portable electronic device may be reduced when user experience of a 3D application is not affected.

DESCRIPTION OF EMBODIMENTS

The following describes specific implementations of the present invention in detail.

First, several terms appearing in this application document are described.

Ordinal numbers such as "first" and "second" appearing in this application are used only for distinguishing rather than limiting a sequence, except those specifically representing a sequence with reference to context.

In this application document, "graphics frame" is data that describes a static display picture, and the display picture presents three-dimensional space including at least one three-dimensional object. "Display scenario" is a sequence including at least one graphics frame, "model" is a model established for a three-dimensional object, "rendering" is a process of drawing the foregoing model as a two-dimensional image, and "image frame" is a two-dimensional image obtained by rendering.

Figure 8:
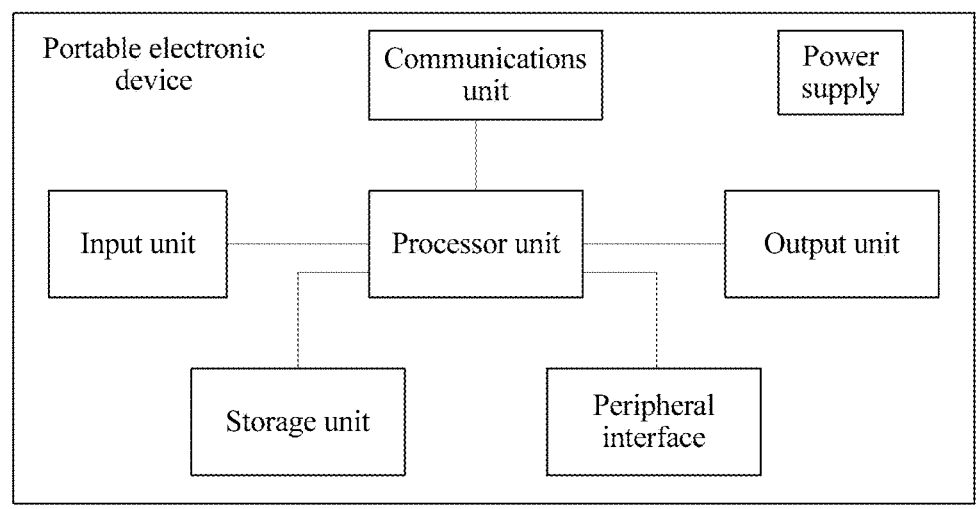
FIG. 8 is a schematic diagram of an overall architecture of a portable electronic device.

Various embodiments of the present invention are usually implemented in a portable electronic device. As shown in FIG. 8, the electronic device includes components such as an input unit, a processor unit, an output unit, a communications unit, a storage unit, and a peripheral unit. These components communicate with each other by using one or more buses. A person skilled in the art may understand that a structure of the electronic device shown in the figure does not constitute a limitation on the present invention. The structure may be a bus structure, or may be a star structure, or may include more or fewer components than those shown in the figure, or combine some parts, or have different parts arrangements. In the implementations of the present invention, the electronic device may be any mobile or portable electronic device, including but not limited to a mobile phone, a mobile computer, a tablet computer, a personal digital assistant (Personal Digital Assistant, PDA), a media player, a smart television, and a combination of the foregoing two or more items.

The input unit is configured to implement interaction between a user and the electronic device and/or input information to the electronic device. For example, the input unit may receive digit or character information that the user enters, so as to generate signal input related to user setting or function control. In a specific implementation of the present invention, the input unit may be a touch panel; or may be another human-machine interaction interface, such as a physical input key or a microphone; or may be another external information capture apparatus, such as a camera. A touch panel, also referred to as a touchscreen, may collect an operation action of touching or approaching performed by a user on the touch panel. For example, the user performs an operation action on the touch panel or at a position close to the touch panel by using any proper object or accessory such as a finger or a stylus, and a corresponding connecting apparatus is driven according to a preset program. Optionally, the touch panel may include two parts: a touch detection apparatus and a touch controller. The touch detection apparatus detects a touch operation of a user, converts the detected touch operation into an electrical signal, and transmits the electrical signal to the touch controller. The touch controller receives the electrical signal from the touch detection apparatus, converts the electrical signal into contact coordinates, and then sends the contact coordinates to a processing unit. The touch controller may further receive and execute a command sent by the processing unit. In addition, the touch panel may be implemented by using multiple types such as a resistive type, a capacitive type, an infrared (Infrared) ray, and a surface acoustic wave. In another implementation of the present invention, the physical input key used by the input unit may include but is not limited to one or more of a physical keyboard, a function button (such as a volume control button or a switch button), a trackball, a mouse, a joystick, or the like. An input unit in a form of a microphone may collect a voice that the user or an environment enters, and convert the voice into a command that is in a form of an electric signal and may be executed by the processing unit.

The input unit may also be a sensing component in various types. For example, a Hall component is configured to detect a physical quantity of the electronic device, such as a force, a torque, a pressure, a stress, a position, a displacement, a speed, an acceleration, an angle, an angular velocity, a quantity of revolutions, a rotational speed, and a time at which a working status changes, and convert the physical quantity into an electric quantity to perform detection and control. Other sensing components may further include a gravity sensor, a tri-axis accelerometer, a gyroscope, and the like.

The processor unit, as a control center of the electronic device, is connected to various parts of the entire electronic device by using various interfaces and lines, and implements various functions of the electronic device and/or processes data by running or executing a software program and/or module stored in the storage unit and invoking data stored in the storage unit. The processor unit may include an integrated circuit (Integrated Circuit, IC for short). For example, the processor unit may include a single packaged IC, or may include multiple connected packaged ICs that have a same function or different functions. For example, the processor unit may include only a central processing unit (Central Processing Unit, CPU for short), or may be a combination of a GPU, a digital signal processor (Digital Signal Processor, DSP for short), and a control chip (for example, a baseband chip) in the communications unit. In the implementations of the present invention, the CPU may be a single computing core, or may include multiple computing cores.

The communications unit is configured to establish a communications channel, so that the electronic device connects to a remote server by using the communications channel, and downloads media data from the remote server. The communications unit may include a communications module, such as a wireless local area network (Wireless Local Area Network, wireless LAN for short) module, a Bluetooth module, and a baseband (Base Band) module, and a radio frequency (Radio Frequency, RF for short) circuit that is corresponding to the communications module and that is configured to perform wireless local area network communication, Bluetooth communication, infrared ray communication and/or cellular communications system communication, such as wideband code division multiple access (Wideband Code Division Multiple Access, W-CDMA for short) and/or high speed download packet access (High Speed Downlink Packet Access, HSDPA for short). The communications module is configured to control communication between all the components in the electronic device, and may support direct memory access (Direct Memory Access).

In different implementations of the present invention, each communications module in the communications unit usually appears in a form of an integrated circuit chip (Integrated Circuit Chip), and may be selectively combined without a need to include all communications modules and corresponding antenna groups. For example, the communications unit may include only a baseband chip, a radio frequency chip, and a corresponding antenna, so as to provide a communication function in a cellular communications system. The electronic device may connect to a cellular network (Cellular Network) or the Internet (Internet) via a wireless communications connection established by the communications unit, for example, by using wireless local area network access or WCDMA access. In some optional implementations of the present invention, the communications module, such as the baseband module, in the communications unit may be integrated into the processor unit, typically, such as APQ+MDM platforms provided by Qualcomm (Qualcomm).

The radio frequency circuit is configured to receive and send information, or receive and send a signal during a call. For example, after receiving downlink information from a base station, the radio frequency circuit sends the downlink information of the base station to the processing unit for processing; and further, sends designed uplink data to the base station. Usually, the radio frequency circuit includes a well-known circuit used to perform these functions, and the well-known circuit includes but is not limited to an antenna system, a radio frequency transceiver, one or more amplifiers, a tuner, one or more oscillators, a digital signal processor, a codec (Codec) chipset, a subscriber identity module (SIM) card, a memory, and the like. In addition, the radio frequency circuit may further communicate with a network and another device by means of wireless communication. The wireless communication may use any communications standard or protocol, including but not limited to GSM (Global System of Mobile communication, Global System for Mobile Communications), GPRS (General Packet Radio Service, General Packet Radio Service), CDMA (Code Division Multiple Access, Code Division Multiple Access), WCDMA (Wideband Code Division Multiple Access, Wideband Code Division Multiple Access), High Speed Uplink Packet Access technology (High Speed Uplink Packet Access, HSUPA), LTE (Long Term Evolution, Long Term Evolution), email, SMS (Short Messaging Service, Short Messaging Service), or the like.

The output unit includes but is not limited to an image output unit and a voice output unit. The image output unit is configured to output a text, a picture, and/or a video. The image output unit may include a display panel, for example, a display panel configured in a form of an LCD (Liquid Crystal Display, liquid crystal display), an OLED (Organic Light-Emitting Diode, organic light-emitting diode), a field emission display (field emission display, FED for short), or the like. Alternatively, the image output unit may include a reflective display, for example, an electrophoretic (electrophoretic) display, or a display using an interferometric modulation of light (Interferometric Modulation of Light) technology. The image output unit may include a single display or multiple displays in different sizes. In a specific implementation of the present invention, the touch panel used by the foregoing input unit may be simultaneously used as the display panel of the output unit. For example, after detecting a gesture operation of touching or approaching on the touch panel, the touch panel transmits the gesture operation to the processing unit to determine a touch event type, and then the processing unit provides corresponding visual output on the display panel according to the touch event type. In FIG. 8, the input unit and the output unit serve as two independent parts to implement input and output functions of the electronic device. However, in some embodiments, the touch panel and the display panel may be integrated to implement the input and output functions of the electronic device. For example, the image output unit may display various graphical user interfaces (Graphical User Interface, GUI for short) as virtual control components, including but not limited to a window, a scroll bar, an icon, and a clipboard, so that a user performs an operation in a touch manner.

The image output unit includes a filter and an amplifier, configured to filter and amplify a video output by the processing unit. The audio output unit includes a digital-to-analog converter, configured to convert an audio signal, output by the processing unit, from a digital format to an analog format.

The storage unit may be configured to store a software program and a module, and the processing unit executes various functional applications of the electronic device and implements data processing by running the software program and the module that are stored in the storage unit. The storage unit mainly includes a program storage area and a data storage area. The program storage area may store an operating system and an application program required by at least one function, such as a sound playback program and an image playback program. The data storage area may store data (such as audio data or a phonebook) created according to use of the electronic device, and the like. In a specific implementation of the present invention, the storage unit may include a volatile memory, such as a nonvolatile random access memory (Nonvolatile Random Access Memory, NVRAM for short), a phase change random access memory (Phase Change RAM, PRAM for short), or a magnetoresistive random access memory (Magetoresistive RAM, MRAM for short), and may further include a nonvolatile memory, such as at least one magnetic disk storage device, an electrically erasable programmable read-only memory (Electrically Erasable Programmable Read-Only Memory, EEPROM for short), or a flash memory device, such as an NOR flash memory (NOR flash memory) or an NAND flash memory (NAND flash memory). The nonvolatile memory stores an operating system and an application program executed by the processing unit. The processing unit loads a running program and data from the nonvolatile memory into a memory and stores digital content in a massive storage apparatus. The operating system includes various components and/or drives that are configured to control and manage a conventional system task, such as memory management, storage device control, or power management, and facilitate communication between various software and hardware. The operating system may be the Android system of Google, the iOS system developed by Apple, the Windows operating system developed by Microsoft, or the like; or may be an embedded operating system such as VxWorks.

The application program includes any application installed in the electronic device, including but not limited to a browser, an email, an instant messaging service, word processing, keyboard virtualization, a window widget (Widget), encryption, digital copyright management, speech recognition, voice duplication, positioning (for example, a function provided by the Global Positioning System), music playback, or the like.

A power supply is configured to supply power to different parts of the electronic device to maintain running of the parts. Generally, the power supply may be a built-in battery, for example, a common lithium-ion battery or a nickel metal hydride battery, or may include an external power supply that directly supplies power to the electronic device, for example, an AC adapter. In some implementations of the present invention, the power supply may further be defined in a wider scope; for example, may further include a power management system, a power charging system, a power failure detection circuit, a power converter or inverter, a power status indicator (such as a light-emitting diode), and any other components related to power generation, management, and distribution of the electronic device.

The following embodiments of the present invention mainly relate to the processor unit and the image output unit of the foregoing portable electronic device, and specifically, to a central processing unit (CPU) and a graphics processing unit (GPU).

Figure 9:
FIG. 9 is an example of a display picture.

In 3D graphics processing, 3D rendering is generally performed by using the graphics processing unit. In a process of the 3D graphics processing, a graphics frame corresponding to a display picture needs to be generated first. As shown in FIG. 9, a display picture presents three-dimensional space with boundaries, and the space includes various three-dimensional objects. Models of the various three-dimensional objects provide mathematical descriptions of geometric shapes of these three-dimensional objects, and define surface and inner properties of the three-dimensional objects, such as a color, transparency, and reflectivity. The graphics frame further defines a position relationship between these three-dimensional objects and an environment such as a light source and mist in the display picture. Generation of a model is generally executed by code running in the central processing unit (Central Processing Unit, CPU).

A generated model is input to the GPU for rendering. As described above, the GPU is a parallel computing unit that specifically processes vectors, and runs in a pipeline manner. The GPU performs a calculation on model data and map data generated by a 3D application program. The foregoing graphics frame describes three-dimensional space, but a screen of any electronic device is two-dimensional. Therefore, a model included in the graphics frame needs to be projected onto a screen display plane. However, currently, texture patterns on surfaces of various three-dimensional objects are usually implemented in a map manner. That is, two-dimensional graphs that produce the texture patterns are mapped onto surfaces of the foregoing models by using a specific algorithm. The GPU performs a calculation on the foregoing model data and map data in a hardware manner; completes fixed point positioning, combination, and shading, that is, connects vertices to form fragments and then completes complex computing such as rendering; and finally outputs an image frame.

Usually, adaptation processing needs to be further performed on a two-dimensional image fame output by the GPU, so as to display the two-dimensional image frame on a display. This processing process is generally executed by a specific circuit module. This module is referred to as a mobile display platform (Mobile Display Platform, MDP) in a Snapdragon (Snapdragon) platform of Qualcomm, and this module is referred to as a display subsystem (Display Subsystem, DSS) in a Kirin (Kirin) platform of Hisilicon.

Figure 1:
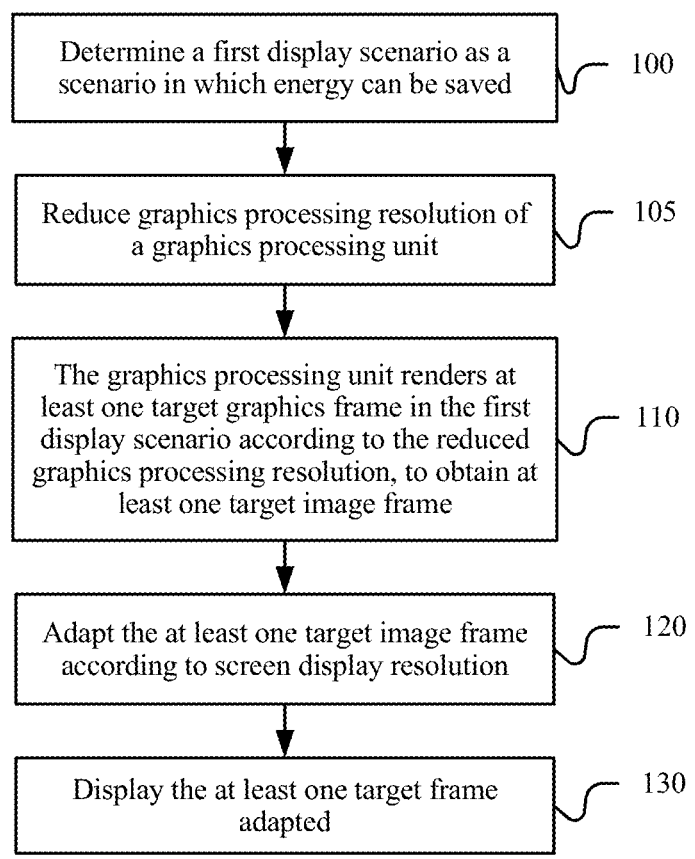
FIG. 1 is a flowchart of a method embodiment according to the present invention.

As shown in FIG. 1, an embodiment of the present invention provides a method for changing graphics processing resolution according to a scenario, including the following steps.

100. Determine a first display scenario as a scenario in which energy can be saved.

The first display scenario herein is a sequence that is generated by an application program and that includes at least one display picture, for example, may be a sequence that includes a series of display pictures in a 3D game. The so-called "scenario in which energy can be saved" is a scenario in which some operations may be performed to reduce power consumption of the scenario when the scenario is processed.

105. Reduce graphics processing resolution of a graphics processing unit.

110. The graphics processing unit (GPU) renders at least one target graphics frame in the first display scenario according to the reduced graphics processing resolution, to obtain at least one target image frame.

Herein, reducing the graphics processing resolution is setting resolution to be less than the graphics processing resolution currently used by the GPU. For example, the GPU performs rendering by using 1920×1080 resolution currently, and may perform rendering by using 1280×720 resolution after reduction. When performing rendering, the GPU performs various calculations on a graphics frame according to specific resolution, for example, performs a calculation by using 1920×1080 resolution. In this case, the GPU establishes a 1920×1080 coordinate system, and maps all models in a graphics frame into the coordinate system for calculation.

A specific way of reducing the image processing resolution may be setting a reduced resolution value, or setting a reduction percentage and multiplying the current resolution and the reduction percentage to perform subsequent processing.

120. Adapt the at least one target image frame according to screen display resolution.

As described above, an operation of this step is generally executed by a specific circuit module, such as an MDP in a Snapdragon platform of Qualcomm or a DSS in a Kirin platform of Hisilicon. Usually, the circuit module performs only simple enlargement on the at least one target image frame. For example, resolution of the at least one target image frame is 1280×720, and the screen display resolution is 1920×1080. Therefore, the circuit module enlarges the at least one target image frame to the 1920×1080 resolution, so that the at least one target image frame can match the screen display resolution.

Certainly, the circuit module may also enlarge the at least one target image frame by using a complex algorithm. For example, interpolation is used, and in this way, an enlarged image may appear smoother.

As known by a person skilled in the art, step 120 may be implemented by using a hardware circuit, and may also be implemented by using software.

130. Display the at least one target image frame adapted.

Figure 2A:
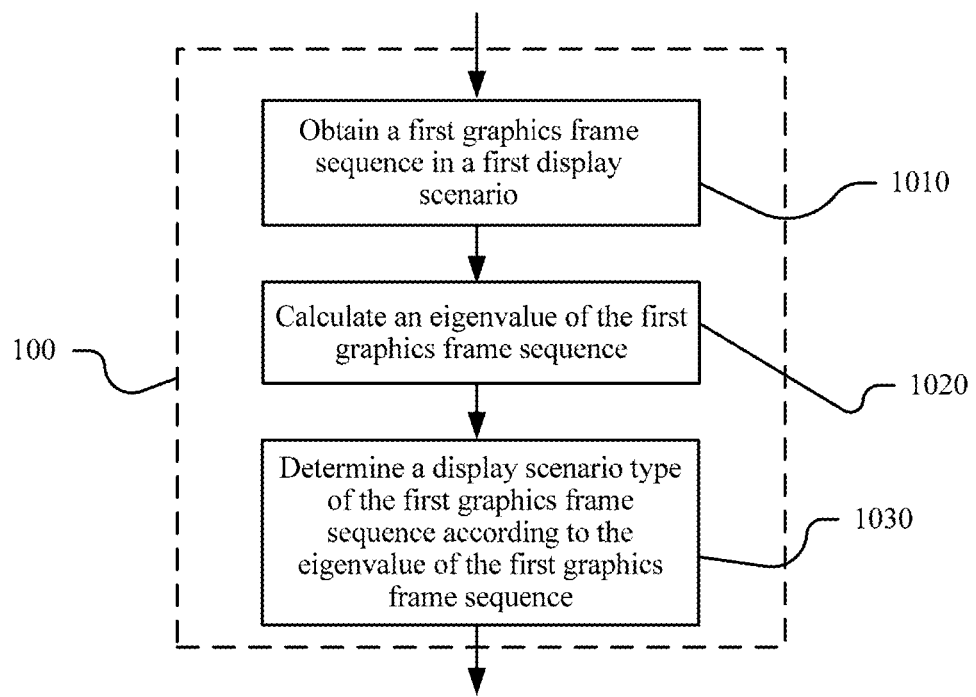
FIG. 2A is a flowchart of some steps in a method embodiment according to the present invention.

Specifically, as shown in FIG. 2A, in an embodiment, the following method may be used to determine the first display scenario as a scenario in which energy can be saved.

1010. Obtain a first graphics frame sequence in the first display scenario.

The first graphics frame sequence herein is a sequence that includes graphics frames corresponding to some display pictures or all display pictures in the first display scenario. The sequence may be selected in multiple manners. For example, graphics frames corresponding to the first N display pictures in the scenario are selected (N is a positive integer), or graphics frames corresponding to pictures to be displayed within a specific period of time (such as one second) are selected, or graphics frames corresponding to several display pictures in the scenario are selected according to a specific rule, such as selecting a display picture whose serial number is an odd number. Certainly, a person skilled in the art may also deduce another possible selection manner on the basis of teaching in the present invention, and this is not limited in the present invention.

1020. Calculate an eigenvalue of the first graphics frame sequence.

In this embodiment, after the first graphics frame sequence is obtained, the first graphics frame in the first model sequence may be used as a first target graphics frame in the first graphics frame sequence to calculate an eigenvalue of the first target graphics frame, and the eigenvalue of the first target graphics frame is used as the eigenvalue of the first graphics frame sequence.

In a possible implementation, the calculating an eigenvalue of the first graphics frame sequence may include at least one of the following steps:

A1. Calculate a thread eigenvalue of the first target graphics frame according to a thread required for rendering the first target graphics frame.

Because different threads may be required for displaying different graphics frames, the thread eigenvalue of the first target graphics frame may be calculated according to the thread required for rendering the first target graphics frame.

A2. Calculate a model eigenvalue of the first target graphics frame according to a model array of the first target graphics frame.

Each graphics frame corresponds to one model array, and a model array of a graphics frame is an array of a quantity of model vertices included in a frame and a quantity of models. Therefore, the model eigenvalue of the target graphics frame may be calculated according to the model array of the first target graphics frame.

A3. Calculate an address eigenvalue of the first target frame according to a buffer address of a model included in the first target graphics frame.

Different models included in a graphics frame have different buffer addresses. Therefore, the address eigenvalue of the first target graphics frame may be calculated according to the buffer address of the model included in the first target frame.

A4. Perform weighted summation on the thread eigenvalue, the model eigenvalue, and the address eigenvalue, to obtain the eigenvalue of the target graphics frame.

After the thread eigenvalue of the target graphics frame, the model eigenvalue of the target graphics frame, and the address eigenvalue of the target graphics frame are obtained, weighted summation may be performed on the three eigenvalues to obtain the eigenvalue of the target graphics frame.

To obtain an eigenvalue of a scenario in which a game is being played and an eigenvalue of a scenario in which no game is being played, a clustering base may be used to analyze an eigenvalue of a graphics frame corresponding to a scenario in which a game is being played and that is in an application program to obtain a game eigenvalue, and the clustering base may be used to analyze an eigenvalue of a graphics frame corresponding to a scenario in which no game is being played and that is in the application program to obtain a non-game eigenvalue. Then, the game eigenvalue and the non-game eigenvalue are stored for subsequent invoking.

1030. Determine a display scenario type of the first graphics frame sequence according to the eigenvalue of the first graphics frame sequence, where the display scenario type includes a scenario in which a game is being played or a scenario in which no game is being played, and the scenario in which a game is being played is a scenario in which energy can be saved.

Figure 7A:
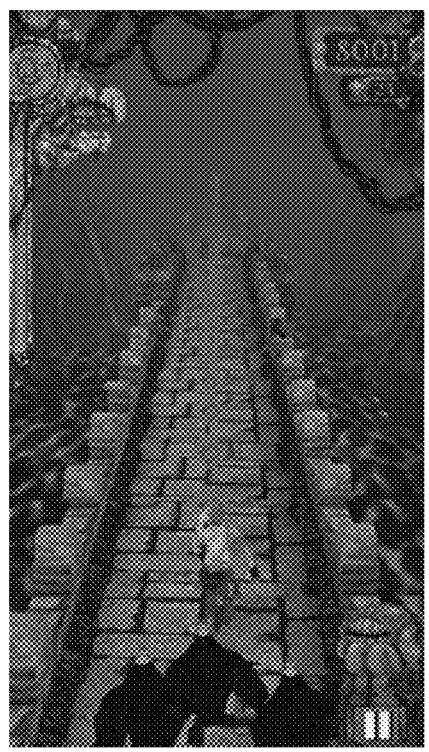
FIG. 7A is an example of a scenario in which a game is being played.
Figure 7B:
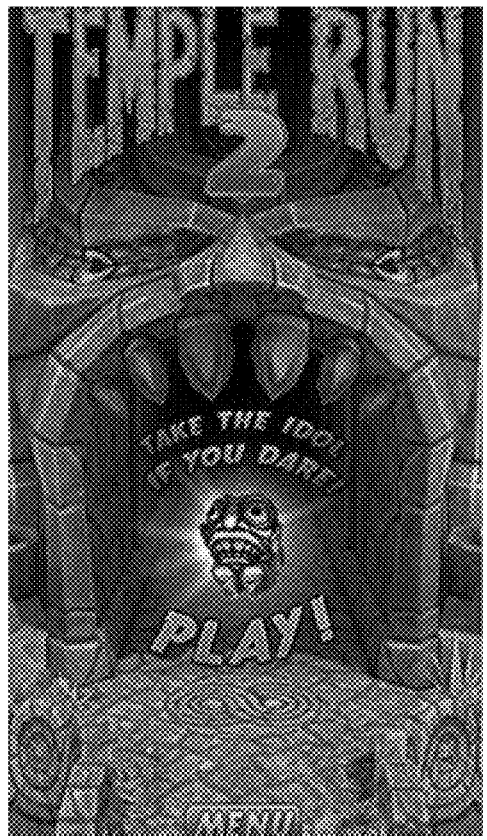
FIG. 7B is an example of a scenario in which no game is being played.

In this embodiment, the display scenario type includes the scenario in which a game is being played or the scenario in which no game is being played, and an eigenvalue of a graphics frame sequence corresponding to the scenario in which a game is being played is greatly different from an eigenvalue of a graphics frame sequence corresponding to the scenario in which no game is being played. Therefore, the display scenario type of the first graphics frame sequence may be determined according to the eigenvalue of the first graphics frame sequence. The scenario in which a game is being played is a scenario in which a user may perform an operation and may obtain a game score. For examples of the scenario in which a game is being played and the scenario in which no game is being played, refer to FIG. 7A. In FIG. 7A, the user may control a character to move, so as to obtain a game score. This is the scenario in which a game is being played. FIG. 7B shows an entry screen of a game application, and this is the scenario in which no game is being played.

In a possible implementation, a manner of determining the display scenario type of the first graphics frame sequence according to the eigenvalue of the first graphics frame sequence is specifically:

calculating an absolute value of a difference between the eigenvalue of the target graphics frame and the game eigenvalue, and when the absolute value of the difference between the eigenvalue of the target graphics frame and the game eigenvalue is less than a preset value, determining the display scenario type of the first graphics frame sequence as the scenario in which a game is being played; or calculating an absolute value of a difference between the eigenvalue of the target graphics frame and the non-game eigenvalue, and when the absolute value of the difference between the eigenvalue of the target frame and the non-game eigenvalue is less than a preset value, determining the display scenario type of the first graphics frame sequence as the scenario in which no game is being played.

Usually, in the scenario in which a game is being played, there are a large quantity of models that relatively rapidly change, the GPU performs a large quantity of calculations, and human eyes are less sensitive to resolution of a rapidly changing picture. Therefore, if graphics rendering resolution is reduced to render the scenario in which a game is being played, user experience is not affected while power consumption of the GPU is effectively reduced.

Figure 2B:
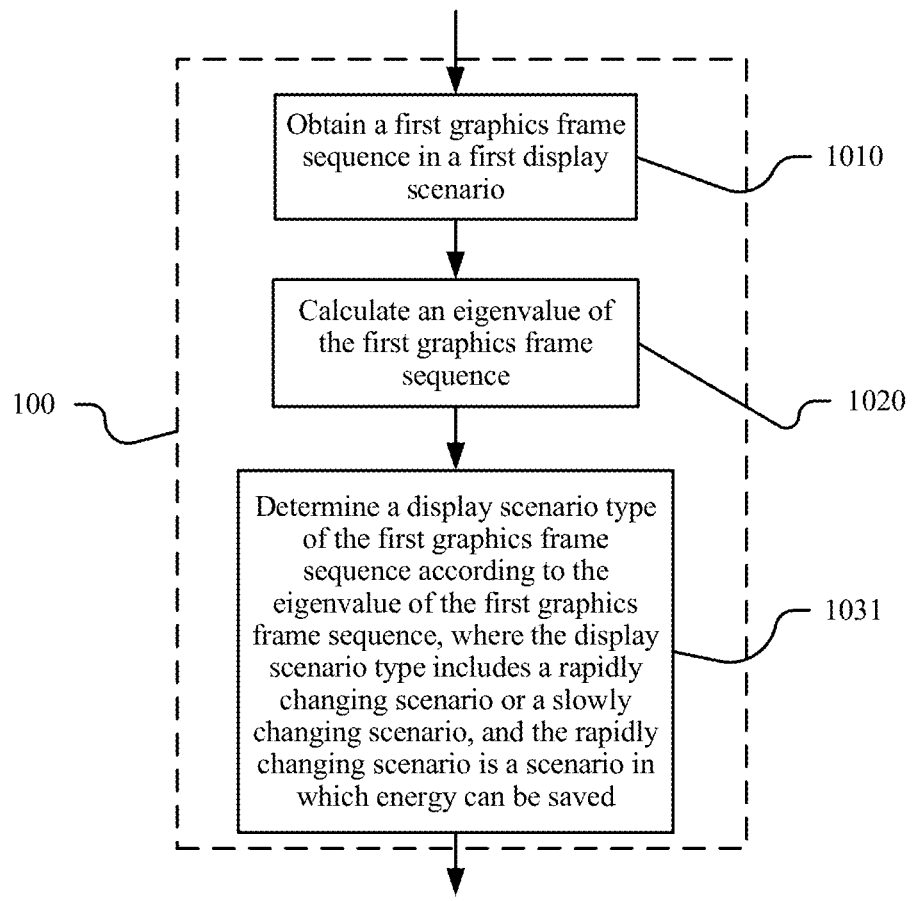
FIG. 2B is a flowchart of some steps in another method embodiment according to the present invention.

As shown in FIG. 2B, in another embodiment of the present invention, the following method may be used to determine the first display scenario as a scenario in which energy can be saved.

1010. Obtain a first graphics frame sequence in the first display scenario.

The first graphics frame sequence herein is a sequence that includes graphics frames corresponding to some display pictures or all display pictures in the first display scenario. The sequence may be selected in multiple manners. For example, graphics frames corresponding to the first N display pictures in the scenario are selected (N is a positive integer), or graphics frames corresponding to pictures to be displayed within a specific period of time (such as one second) are selected, or graphics frames corresponding to several display pictures in the scenario are selected according to a specific rule, such as selecting a display picture whose serial number is an odd number. Certainly, a person skilled in the art may also deduce another possible selection manner on the basis of teaching in the present invention, and this is not limited in the present invention.

1020. Calculate an eigenvalue of the first graphics frame sequence.

In this embodiment, similarity of all frames in the first graphics frame sequence is calculated and used as the eigenvalue of the first graphics frame sequence.

A method for calculating similarity of all graphics frames is obtaining, by means of comparison, percentages of different data in whole data in all the graphics frames and using a sum of the percentages as the similarity of all the graphics frames. A graphics frame generally includes model data, map data, environment data, and the like. As described above, these data represents shapes, positions, surface properties, environments, and the like of various three-dimensional objects. Differences of these data are compared, the percentages of the different data in the whole data in all the graphics frames are summed, and an obtained value may be used as the similarity of all the frames.

1031. Determine a display scenario type of the first graphics frame sequence according to the eigenvalue of the first graphics frame sequence, where the display scenario type includes a rapidly changing scenario or a slowly changing scenario, and the rapidly changing scenario is a scenario in which energy can be saved.

In an embodiment, if the foregoing similarity is less than a slow-change threshold, a display scenario corresponding to the first graphics frame sequence is determined as a slowly changing scenario, or otherwise, the display scenario corresponding to the first graphics frame sequence is determined as a rapidly changing scenario.

In another embodiment, when the foregoing similarity is greater than a rapid-change threshold, a display scenario corresponding to the first graphics frame sequence is determined as a rapidly changing scenario, or otherwise, the display scenario corresponding to the first graphics frame sequence is determined as a slowly changing scenario.

Usually, the GPU performs a large quantity of calculations in a rapidly changing scenario, and human eyes are less sensitive to resolution of a rapidly changing picture. Therefore, if graphics rendering resolution is reduced to render the rapidly changing scenario, user experience is not affected while power consumption of the GPU is effectively reduced.

Figure 3:
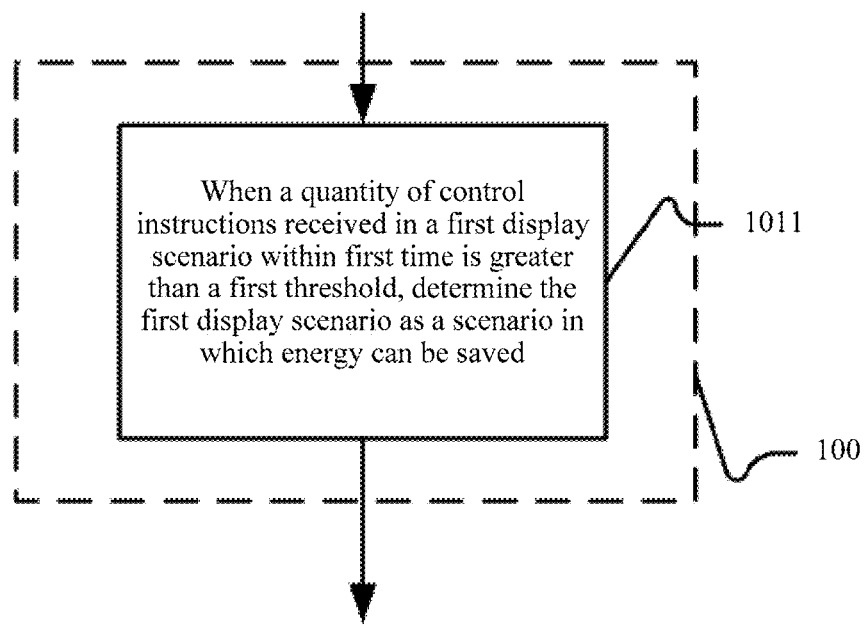
FIG. 3 is a flowchart of some steps in another method embodiment according to the present invention.

As shown in FIG. 3, in still another embodiment of the present invention, step 100 includes:

1011. When a quantity of control instructions received in the first display scenario within first time is greater than a first threshold, determine the first display scenario as a scenario in which energy can be saved.

The first time herein is a period of time in duration of the first display scenario, and a specific length may be selected according to a requirement, such as one second. A location at which the first time is located in the first display scenario may also be selected according to a requirement, for example, may be a period of time at the very beginning of the first display scenario. The control instruction is an operation instruction for the first display scenario, for example, control of a character in a game, or rotation or movement of a three-dimensional object.

If the quantity of control instructions received within the first time is less than the first threshold, it indicates that the user performs relatively much control on the three-dimensional object in the first display scenario. In this way, the first display scenario relatively rapidly changes, so that a measure of reducing power consumption may be taken.

Figure 4:
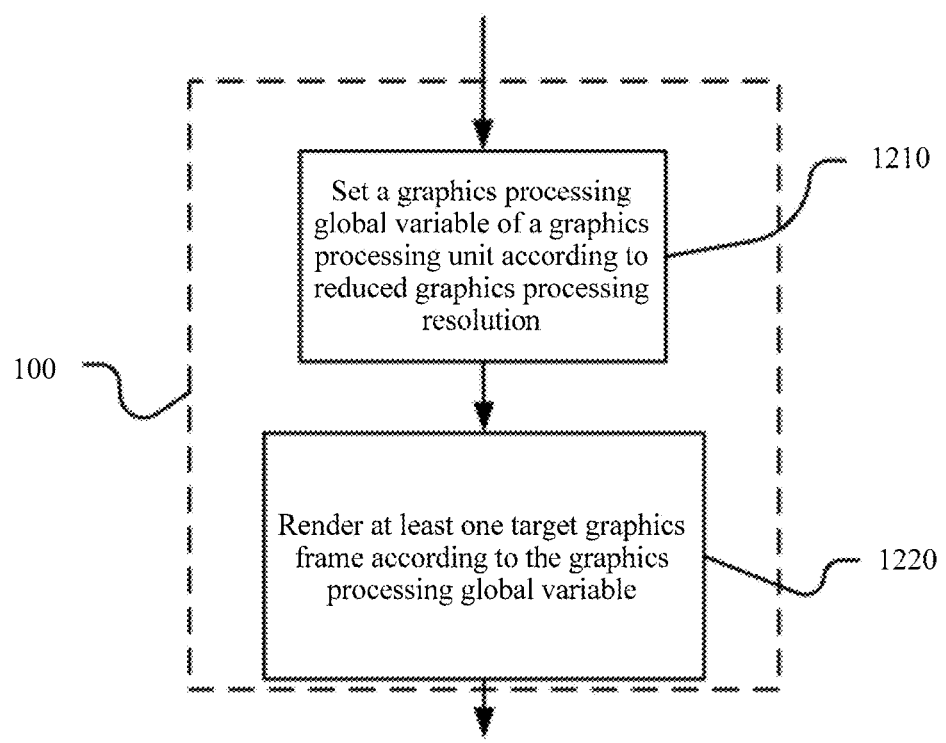
FIG. 4 is a flowchart of some steps in still another method embodiment according to the present invention.

As shown in FIG. 4, in an embodiment, step 120 described above includes:

1210. Set a graphics processing global variable of the graphics processing unit according to the reduced graphics processing resolution.

When performing rendering, the GPU sets a series of global variables, such as a focal length, a size of a model array, and a buffer size. These global variables are related to the graphics processing resolution. After the graphics processing resolution is reduced, these global variables are changed accordingly.

1220. Render the at least one target graphics frame according to the graphics processing global variable.

After the foregoing global variable is changed, the GPU may render the at least one target graphics frame according to the reduced graphics processing resolution. Specifically, the GPU includes a large quantity of computing units, and the GPU adjusts, according to a calculation quantity, a computing unit participating in a rendering calculation. After the global variable is set according to the reduced graphics processing resolution, a quantity of computing units in the GPU that participate in the rendering calculation is reduced, thereby reducing power consumption.

By means of the method provided in this embodiment of the present invention, user experience of a 3D application program is not affected while power consumption of the GPU is reduced.

In an embodiment of the present invention, a user may enable or disable, by using a hardware switch or a soft switch in a portable electronic device, execution of the method provided in this embodiment of the present invention.

In another embodiment, the execution of the method provided in this embodiment of the present invention may be enabled or stopped adaptively. For example, a quantity of times that the user exits an application program after step 130 is executed is collected, where the application program herein is an application program that generates the first graphics frame. When the quantity of times is greater than a tolerance threshold, the execution of the method provided in this embodiment of the present invention is stopped.

In an embodiment, the graphics processing resolution of the GPU may be reduced gradually, to prevent the user from sensing that the resolution is changed suddenly.

Figure 5:
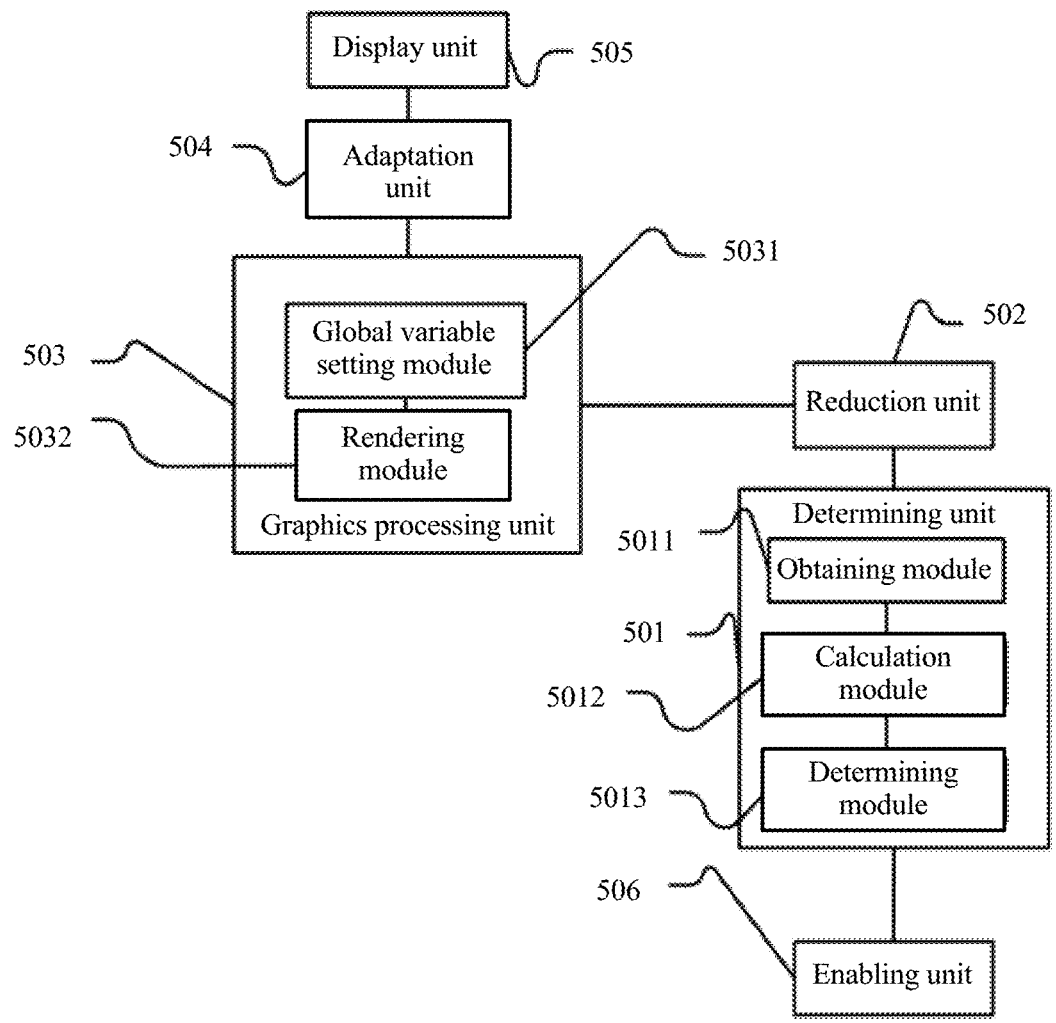
FIG. 5 is a schematic structural diagram of a portable electronic device according to an embodiment of the present invention.

As shown in FIG. 5, an embodiment of the present invention provides a portable electronic device, including a determining unit 501, a reduction unit 502, a graphics processing unit 503, an adaptation unit 504, and a display unit 505.

The determining unit 501 is configured to determine a first display scenario as a scenario in which energy can be saved.

The first display scenario herein is a sequence that is generated by an application program and that includes at least one display picture, for example, may be a sequence that includes a series of display pictures in a 3D game. The so-called "scenario in which energy can be saved" is a scenario in which some operations may be performed to reduce power consumption of the scenario when the scenario is processed.

The reduction unit 502 is configured to reduce graphics processing resolution of a graphics processing unit 503.

The graphics processing unit 503 is configured to render at least one target graphics frame in the first display scenario according to the reduced graphics processing resolution, to obtain at least one target image frame.

Herein, reducing the graphics processing resolution is setting resolution to be less than the graphics processing resolution currently used by the GPU. For example, the GPU performs rendering by using 1920×1080 resolution currently, and may perform rendering by using 1280×720 resolution after reduction. When performing rendering, the GPU performs various calculations on a graphics frame according to specific resolution, for example, performs a calculation by using 1920×1080 resolution. In this case, the GPU establishes a 1920×1080 coordinate system, and maps all models in a graphics frame into the coordinate system for calculation.

A specific way of reducing the image processing resolution may be setting a reduced resolution value, or setting a reduction percentage and multiplying the current resolution and the reduction percentage to perform subsequent processing.

The adaptation unit 504 is configured to adapt the at least one target image frame according to screen display resolution.

As described above, the unit is generally a specific circuit module, such as an MDP in a Snapdragon platform of Qualcomm or a DSS in a Kirin platform of Hisilicon. Usually, the circuit module performs only simple enlargement on the at least one target image frame. For example, resolution of the at least one target image frame is 1280×720, and the screen display resolution is 1920×1080. Therefore, the circuit module enlarges the at least one target image frame to the 1920×1080 resolution, so that the at least one target image frame can match the screen display resolution.

Certainly, the circuit module may also enlarge the at least one target image frame by using a complex algorithm. For example, interpolation is used, and in this way, an enlarged image may appear smoother.

As known by a person skilled in the art, the adaptation unit 504 may be implemented by using a hardware circuit, and may also be implemented by using software.

The display unit 505 is configured to display the at least one target image frame adapted.

Specifically, as shown in FIG. 5, in an embodiment, the determining unit 501 includes an obtaining module 5011, a calculation module 5012, and a determining module 5013.

The obtaining module 5011 is configured to obtain a first graphics frame sequence in the first display scenario.

The first graphics frame sequence herein is a sequence that includes graphics frames corresponding to some display pictures or all display pictures in the first display scenario. The sequence may be selected in multiple manners. For example, graphics frames corresponding to the first N display pictures in the scenario are selected (N is a positive integer), or graphics frames corresponding to pictures to be displayed within a specific period of time (such as one second) are selected, or graphics frames corresponding to several display pictures in the scenario are selected according to a specific rule, such as selecting a display picture whose serial number is an odd number. Certainly, a person skilled in the art may also deduce another possible selection manner on the basis of teaching in the present invention, and this is not limited in the present invention.

The calculation module 5012 is configured to calculate an eigenvalue of the first graphics frame sequence.

In this embodiment, after the first graphics frame sequence is obtained, the first graphics frame in the first model sequence may be used as a target graphics frame in the first graphics frame sequence to calculate an eigenvalue of the target graphics frame, and the eigenvalue of the target graphics frame is used as the eigenvalue of the first graphics frame sequence.

In a possible implementation, the calculating an eigenvalue of the first graphics frame sequence may include at least one of the following manners:

A1. Calculate a thread eigenvalue of the target graphics frame according to a thread required for rendering the target graphics frame.

Because different threads may be required for displaying different graphics frames, the thread eigenvalue of the target graphics frame may be calculated according to the thread required for rendering the target graphics frame.

A2. Calculate a model eigenvalue of the target graphics frame according to a model array of the target graphics frame.

Each graphics frame corresponds to one model array, and a model array of a graphics frame is an array of a quantity of model vertices included in a frame and a quantity of models. Therefore, the model eigenvalue of the target graphics frame may be calculated according to the model array of the target graphics frame.

A3. Calculate an address eigenvalue of the target graphics frame according to a buffer address of a model included in the target graphics frame.

Different models included in a graphics frame have different buffer addresses. Therefore, the address eigenvalue of the target graphics frame may be calculated according to the buffer address of the model included in the target frame.

A4. Perform weighted summation on the thread eigenvalue, the model eigenvalue, and the address eigenvalue, to obtain the eigenvalue of the target graphics frame.

After the thread eigenvalue of the target graphics frame, the model eigenvalue of the target graphics frame, and the address eigenvalue of the target graphics frame are obtained, weighted summation may be performed on the three eigenvalues to obtain the eigenvalue of the target graphics frame.

To obtain an eigenvalue of a scenario in which a game is being played and an eigenvalue of a scenario in which no game is being played, a clustering base may be used to analyze an eigenvalue of a graphics frame corresponding to a scenario in which a game is being played and that is in an application program to obtain a game eigenvalue, and the clustering base may be used to analyze an eigenvalue of a graphics frame corresponding to a scenario in which no game is being played and that is in the application program to obtain a non-game eigenvalue. Then, the game eigenvalue and the non-game eigenvalue are stored for subsequent invoking.

The determining module 5013 is configured to determine a display scenario type of the first graphics frame sequence according to the eigenvalue of the first graphics frame sequence. The display scenario type includes a scenario in which a game is being played or a scenario in which no game is being played, and the scenario in which a game is being played is a scenario in which energy can be saved.

In this embodiment, the display scenario type includes the scenario in which a game is being played or the scenario in which no game is being played, and an eigenvalue of a graphics frame sequence corresponding to the scenario in which a game is being played is greatly different from an eigenvalue of a graphics frame sequence corresponding to the scenario in which no game is being played. Therefore, the display scenario type of the first graphics frame sequence may be determined according to the eigenvalue of the first graphics frame sequence. The scenario in which a game is being played is a scenario in which a user may perform an operation and may obtain a game score. For examples of the scenario in which a game is being played and the scenario in which no game is being played, refer to FIG. 7A and FIG. 7B. In FIG. 7A, the user may control a character to move, so as to obtain a game score. This is the scenario in which a game is being played. FIG. 7B shows an entry screen of a game application, and this is the scenario in which no game is being played.

In a possible implementation, a manner of determining the display scenario type of the first graphics frame sequence according to the eigenvalue of the first graphics frame sequence is specifically:

calculating an absolute value of a difference between the eigenvalue of the target graphics frame and the game eigenvalue, and when the absolute value of the difference between the eigenvalue of the target graphics frame and the game eigenvalue is less than a preset value, determining the display scenario type of the first graphics frame sequence as the scenario in which a game is being played; or calculating an absolute value of a difference between the eigenvalue of the target graphics frame and the non-game eigenvalue, and when the absolute value of the difference between the eigenvalue of the target frame and the non-game eigenvalue is less than a preset value, determining the display scenario type of the first graphics frame sequence as the scenario in which no game is being played.

Usually, in the scenario in which a game is being played, there are a large quantity of models that relatively rapidly change, the GPU performs a large quantity of calculations, and human eyes are less sensitive to resolution of a rapidly changing picture. Therefore, if graphics rendering resolution is reduced to render the scenario in which a game is being played, user experience is not affected while power consumption of the GPU is effectively reduced.

As shown in FIG. 5, in another embodiment of the present invention, the determining unit 501 includes an obtaining module 5011, a calculation module 5012, and a determining module 5013.

The obtaining module 5011 is configured to obtain a first graphics frame sequence in the first display scenario.

The first graphics frame sequence herein is a sequence that includes graphics frames corresponding to some display pictures or all display pictures in the first display scenario. The sequence may be selected in multiple manners. For example, graphics frames corresponding to the first N display pictures in the scenario are selected (N is a positive integer), or graphics frames corresponding to pictures to be displayed within a specific period of time (such as one second) are selected, or graphics frames corresponding to several display pictures in the scenario are selected according to a specific rule, such as selecting a display picture whose serial number is an odd number. Certainly, a person skilled in the art may also deduce another possible selection manner on the basis of teaching in the present invention, and this is not limited in the present invention.

The calculation module 5012 is configured to calculate an eigenvalue of the first graphics frame sequence.

In this embodiment, similarity of all frames in the first graphics frame sequence is calculated and used as the eigenvalue of the first graphics frame sequence.

A method for calculating similarity of all graphics frames is obtaining, by means of comparison, percentages of different data in whole data in all the graphics frames and using a sum of the percentages as the similarity of all the graphics frames. A graphics frame generally includes model data, map data, environment data, and the like. As described above, these data represents shapes, positions, surface properties, environments, and the like of various three-dimensional objects. Differences of these data are compared, the percentages of the different data in the whole data in all the graphics frames are summed, and an obtained value may be used as the similarity of all the frames.

The determining module 5013 is configured to determine a display scenario type of the first graphics frame sequence according to the eigenvalue of the first graphics frame sequence. The display scenario type includes a rapidly changing scenario or a slowly changing scenario, and the rapidly changing scenario is a scenario in which energy can be saved.

In an embodiment, if the foregoing similarity is less than a slow-change threshold, a display scenario corresponding to the first graphics frame sequence is determined as a slowly changing scenario, or otherwise, the display scenario corresponding to the first graphics frame sequence is determined as a rapidly changing scenario.

In another embodiment, when the foregoing similarity is greater than a rapid-change threshold, a display scenario corresponding to the first graphics frame sequence is determined as a rapidly changing scenario, or otherwise, the display scenario corresponding to the first graphics frame sequence is determined as a slowly changing scenario.

Usually, the GPU performs a large quantity of calculations in a rapidly changing scenario, and human eyes are less sensitive to resolution of a rapidly changing picture. Therefore, if graphics rendering resolution is reduced to render the rapidly changing scenario, user experience is not affected while power consumption of the GPU is effectively reduced.

In still another embodiment of the present invention, the determining unit 501 is specifically configured to:

when a quantity of control instructions received in the first display scenario within first time is greater than a first threshold, determine the first display scenario as a scenario in which energy can be saved.

The first time herein is a period of time in duration of the first display scenario, and a specific length may be selected according to a requirement, such as one second. A location at which the first time is located in the first display scenario may also be selected according to a requirement, for example, may be a period of time at the very beginning of the first display scenario. The control instruction is an operation instruction for the first display scenario, for example, control of a character in a game, or rotation or movement of a three-dimensional object.

If the quantity of control instructions received within the first time is less than the first threshold, it indicates that the user performs relatively much control on the three-dimensional object in the first display scenario. In this way, the first display scenario relatively rapidly changes, so that a measure of reducing power consumption may be taken.

As shown in FIG. 5, in an embodiment, the graphics processing unit 503 includes a global variable setting module 5031 and a rendering module 5032.

The global variable setting module 5031 is configured to set a graphics processing global variable of the graphics processing unit according to the reduced graphics processing resolution.

When performing rendering, the GPU sets a series of global variables, such as a focal length, a size of a model array, and a buffer size. These global variables are related to the graphics processing resolution. After the graphics processing resolution is reduced, these global variables are changed accordingly.

The rendering module 5032 is configured to render the at least one target graphics frame according to the graphics processing global variable.

After the foregoing global variable is changed, the GPU may render the at least one target graphics frame according to the reduced graphics processing resolution. Specifically, the GPU includes a large quantity of computing units, and the GPU adjusts, according to a calculation quantity, a computing unit participating in a rendering calculation. After the global variable is set according to the reduced graphics processing resolution, a quantity of computing units in the GPU that participate in the rendering calculation is reduced, thereby reducing power consumption.

The portable electronic device provided in this embodiment of the present invention does not affect user experience of a 3D application program while reducing power consumption of the GPU.

In an embodiment of the present invention, the portable electronic device further includes an enabling module 506, configured to enable or disable the determining module 501 by using a hardware switch or a soft switch.

In another embodiment, the enabling module 506 is specifically configured to adaptively disable the determining module 501; for example, collect a quantity of times that a user exits an application program after the display module 505 displays the at least one target image frame, where the application program herein is an application program that generates the first graphics frame sequence; and disable the determining module 501 when the quantity of times is greater than a tolerance threshold.

In an embodiment, the reduction unit 502 may gradually reduce the graphics processing resolution of the GPU, to prevent the user from sensing that the resolution is changed suddenly.

Figure 6:
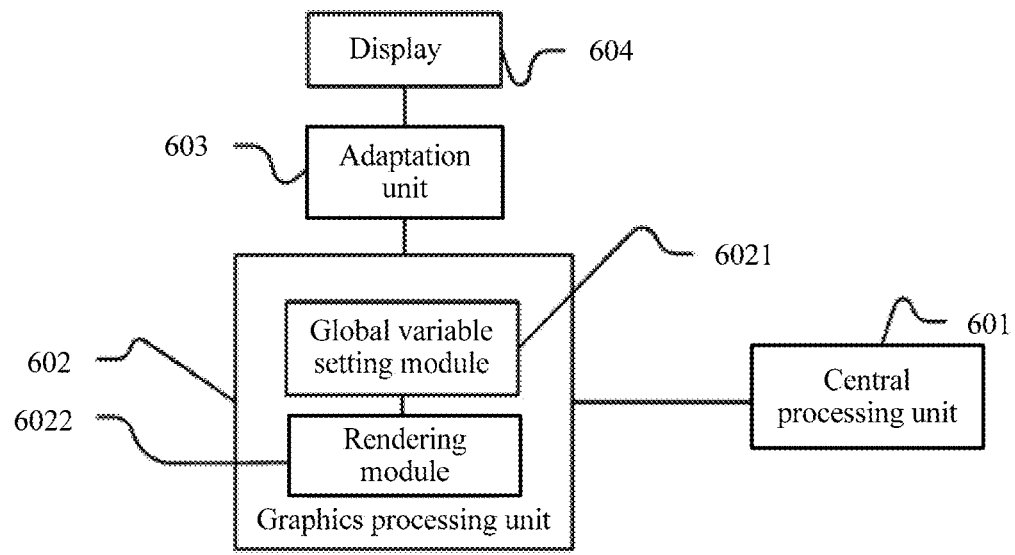
FIG. 6 is a schematic structural diagram of a portable electronic device according to another embodiment of the present invention.

As shown in FIG. 6, an embodiment of the present invention further provides a portable electronic device, including a central processing unit 601, a graphics processing unit 602, a display adapter circuit 603, and a display 604.

The central processing unit 601 is configured to determine a first display scenario as a scenario in which energy can be saved, and reduce graphics processing resolution of the graphics processing unit 602.

The first display scenario herein is a sequence that is generated by an application program and that includes at least one display picture, for example, may be a sequence that includes a series of display pictures in a 3D game. The so-called "scenario in which energy can be saved" is a scenario in which some operations may be performed to reduce power consumption of the scenario when the scenario is processed.

Herein, reducing the graphics processing resolution is setting resolution to be less than the graphics processing resolution currently used by the GPU. For example, the GPU performs rendering by using 1920×1080 resolution currently, and may perform rendering by using 1280×720 resolution after reduction. When performing rendering, the GPU performs various calculations on a graphics frame according to specific resolution, for example, performs a calculation by using 1920×1080 resolution. In this case, the GPU establishes a 1920×1080 coordinate system, and maps all models in a graphics frame into the coordinate system for calculation.

A specific way of reducing the image processing resolution may be setting a reduced resolution value, or setting a reduction percentage and multiplying the current resolution and the reduction percentage to perform subsequent processing.

The graphics processing unit 602 is configured to render at least one target graphics frame in the first display scenario according to the reduced graphics processing resolution, to obtain at least one target image frame.

The central processing unit 601 and the graphics processing unit 602 may be separately located in two chips, or may be integrated in one chip.

The display adapter circuit 603 is configured to adapt the at least one target image frame according to display resolution of the display 604.

As described above, the circuit is generally a specific circuit module, such as an MDP in a Snapdragon platform of Qualcomm or a DSS in a Kirin platform of Hisilicon. Usually, the circuit module performs only simple enlargement on the at least one target image frame. For example, resolution of the at least one target image frame is 1280×720, and the screen display resolution is 1920×1080. Therefore, the circuit module enlarges the at least one target image frame to the 1920×1080 resolution, so that the at least one target image frame can match the screen display resolution.

Certainly, the circuit may also enlarge the at least one target image frame by using a complex algorithm. For example, interpolation is used, and in this way, an enlarged image may appear smoother.

The display 604 is configured to display the at least one target image frame adapted.

The display herein may be a liquid crystal display, an organic light-emitting diode (AMOLED) display, or the like, and is not limited in this embodiment of the present invention.

Specifically, as shown in FIG. 2A, in an embodiment, the determining a first display scenario as a scenario in which energy can be saved includes the following steps.

1010. Obtain a first graphics frame sequence in the first display scenario.

The first graphics frame sequence herein is a sequence that includes graphics frames corresponding to some display pictures or all display pictures in the first display scenario. The sequence may be selected in multiple manners. For example, graphics frames corresponding to the first N display pictures in the scenario are selected (N is a positive integer), or graphics frames corresponding to pictures to be displayed within a specific period of time (such as one second) are selected, or graphics frames corresponding to several display pictures in the scenario are selected according to a specific rule, such as selecting a display picture whose serial number is an odd number. Certainly, a person skilled in the art may also deduce another possible selection manner on the basis of teaching in the present invention, and this is not limited in the present invention.

1020. Calculate an eigenvalue of the first graphics frame sequence.

In this embodiment, after the first graphics frame sequence is obtained, the first graphics frame in the first model sequence may be used as a target graphics frame in the first graphics frame sequence to calculate an eigenvalue of the target graphics frame, and the eigenvalue of the target graphics frame is used as the eigenvalue of the first graphics frame sequence.

In a possible implementation, the calculating an eigenvalue of the first graphics frame sequence may include at least one of the following manners:

A1. Calculate a thread eigenvalue of the target graphics frame according to a thread required for rendering the target graphics frame.

Because different threads may be required for displaying different graphics frames, the thread eigenvalue of the target graphics frame may be calculated according to the thread required for rendering the target graphics frame.

A2. Calculate a model eigenvalue of the target graphics frame according to a model array of the target graphics frame.

Each graphics frame corresponds to one model array, and a model array of a graphics frame is an array of a quantity of model vertices included in a frame and a quantity of models. Therefore, the model eigenvalue of the target graphics frame may be calculated according to the model array of the target graphics frame.

A3. Calculate an address eigenvalue of the target graphics frame according to a buffer address of a model included in the target graphics frame.

Different models included in a graphics frame have different buffer addresses. Therefore, the address eigenvalue of the target graphics frame may be calculated according to the buffer address of the model included in the target frame.

A4. Perform weighted summation on the thread eigenvalue, the model eigenvalue, and the address eigenvalue, to obtain the eigenvalue of the target graphics frame.

After the thread eigenvalue of the target graphics frame, the model eigenvalue of the target graphics frame, and the address eigenvalue of the target graphics frame are obtained, weighted summation may be performed on the three eigenvalues to obtain the eigenvalue of the target graphics frame.

To obtain an eigenvalue of a scenario in which a game is being played and an eigenvalue of a scenario in which no game is being played, a clustering base may be used to analyze an eigenvalue of a graphics frame corresponding to a scenario in which a game is being played and that is in an application program to obtain a game eigenvalue, and the clustering base may be used to analyze an eigenvalue of a graphics frame corresponding to a scenario in which no game is being played and that is in the application program to obtain a non-game eigenvalue. Then, the game eigenvalue and the non-game eigenvalue are stored for subsequent invoking.

1030. Determine a display scenario type of the first graphics frame sequence according to the eigenvalue of the first graphics frame sequence, where the display scenario type includes a scenario in which a game is being played or a scenario in which no game is being played, and the scenario in which a game is being played is a scenario in which energy can be saved.

In this embodiment, the display scenario type includes the scenario in which a game is being played or the scenario in which no game is being played, and an eigenvalue of a graphics frame sequence corresponding to the scenario in which a game is being played is greatly different from an eigenvalue of a graphics frame sequence corresponding to the scenario in which no game is being played. Therefore, the display scenario type of the first graphics frame sequence may be determined according to the eigenvalue of the first graphics frame sequence. The scenario in which a game is being played is a scenario in which a user may perform an operation and may obtain a game score. For examples of the scenario in which a game is being played and the scenario in which no game is being played, refer to FIG. 7A and FIG. 7B. In FIG. 7A, the user may control a character to move, so as to obtain a game score. This is the scenario in which a game is being played. FIG. 7B shows an entry screen of a game application, and this is the scenario in which no game is being played.

In a possible implementation, a manner of determining the display scenario type of the first graphics frame sequence according to the eigenvalue of the first graphics frame sequence is specifically:

calculating an absolute value of a difference between the eigenvalue of the target graphics frame and the game eigenvalue, and when the absolute value of the difference between the eigenvalue of the target graphics frame and the game eigenvalue is less than a preset value, determining the display scenario type of the first graphics frame sequence as the scenario in which a game is being played; or calculating an absolute value of a difference between the eigenvalue of the target graphics frame and the non-game eigenvalue, and when the absolute value of the difference between the eigenvalue of the target frame and the non-game eigenvalue is less than a preset value, determining the display scenario type of the first graphics frame sequence as the scenario in which no game is being played.

Usually, in the scenario in which a game is being played, there are a large quantity of models that relatively rapidly change, the GPU performs a large quantity of calculations, and human eyes are less sensitive to resolution of a rapidly changing picture. Therefore, if graphics rendering resolution is reduced to render the scenario in which a game is being played, user experience is not affected while power consumption of the GPU is effectively reduced.

As shown in FIG. 2B, in another embodiment of the present invention, the determining a first display scenario as a scenario in which energy can be saved includes the following steps.

1010. Obtain a first graphics frame sequence in the first display scenario.

The first graphics frame sequence herein is a sequence that includes graphics frames corresponding to some display pictures or all display pictures in the first display scenario. The sequence may be selected in multiple manners. For example, graphics frames corresponding to the first N display pictures in the scenario are selected (N is a positive integer), or graphics frames corresponding to pictures to be displayed within a specific period of time (such as one second) are selected, or graphics frames corresponding to several display pictures in the scenario are selected according to a specific rule, such as selecting a display picture whose serial number is an odd number. Certainly, a person skilled in the art may also deduce another possible selection manner on the basis of teaching in the present invention, and this is not limited in the present invention.

1020. Calculate an eigenvalue of the first graphics frame sequence.

In this embodiment, similarity of all frames in the first graphics frame sequence is calculated and used as the eigenvalue of the first graphics frame sequence.

A method for calculating similarity of all graphics frames is obtaining, by means of comparison, percentages of different data in whole data in all the graphics frames and using a sum of the percentages as the similarity of all the graphics frames. A graphics frame generally includes model data, map data, environment data, and the like. As described above, these data represents shapes, positions, surface properties, environments, and the like of various three-dimensional objects. Differences of these data are compared, the percentages of the different data in the whole data in all the graphics frames are summed, and an obtained value may be used as the similarity of all the frames.

1031. Determine a display scenario type of the first graphics frame sequence according to the eigenvalue of the first graphics frame sequence, where the display scenario type includes a rapidly changing scenario or a slowly changing scenario, and the rapidly changing scenario is a scenario in which energy can be saved.

In an embodiment, if the foregoing similarity is less than a slow-change threshold, a display scenario corresponding to the first graphics frame sequence is determined as a slowly changing scenario, or otherwise, the display scenario corresponding to the first graphics frame sequence is determined as a rapidly changing scenario.

In another embodiment, when the foregoing similarity is greater than a rapid-change threshold, a display scenario corresponding to the first graphics frame sequence is determined as a rapidly changing scenario, or otherwise, the display scenario corresponding to the first graphics frame sequence is determined as a slowly changing scenario.

Usually, the GPU performs a large quantity of calculations in a rapidly changing scenario, and human eyes are less sensitive to resolution of a rapidly changing picture. Therefore, if graphics rendering resolution is reduced to render the rapidly changing scenario, user experience is not affected while power consumption of the GPU is effectively reduced.

In still another embodiment of the present invention, the determining a first display scenario as a scenario in which energy can be saved includes:

when a quantity of control instructions received in the first display scenario within first time is greater than a first threshold, determining the first display scenario as a scenario in which energy can be saved.

The first time herein is a period of time in duration of the first display scenario, and a specific length may be selected according to a requirement, such as one second. A location at which the first time is located in the first display scenario may also be selected according to a requirement, for example, may be a period of time at the very beginning of the first display scenario. The control instruction is an operation instruction for the first display scenario, for example, control of a character in a game, or rotation or movement of a three-dimensional object.

If the quantity of control instructions received within the first time is less than the first threshold, it indicates that the user performs relatively much control on the three-dimensional object in the first display scenario. In this way, the first display scenario relatively rapidly changes, so that a measure of reducing power consumption may be taken.

As shown in FIG. 6, in an embodiment, the graphics processing unit 602 includes a global variable setting module 6021 and a rendering module 6022.

The global variable setting module 6021 is configured to set a graphics processing global variable of the graphics processing unit according to the reduced graphics processing resolution.

When performing rendering, the GPU sets a series of global variables, such as a focal length, a size of a model array, and a buffer size. These global variables are related to the graphics processing resolution. After the graphics processing resolution is reduced, these global variables are changed accordingly.

The rendering module 6022 is configured to render the at least one target graphics frame according to the graphics processing global variable.

After the foregoing global variable is changed, the GPU may render the at least one target graphics frame according to the reduced graphics processing resolution. Specifically, the GPU includes a large quantity of computing units, and the GPU adjusts, according to a calculation quantity, a computing unit participating in a rendering calculation. After the global variable is set according to the reduced graphics processing resolution, a quantity of computing units in the GPU that participate in the rendering calculation is reduced, thereby reducing power consumption.

The portable electronic device provided in this embodiment of the present invention does not affect user experience of a 3D application program while reducing power consumption of the GPU.

In an embodiment of the present invention, the central processing unit 601 may further receive an enabling instruction, and the determining a first display scenario as a scenario in which energy can be saved includes:

determining, according to the enabling instruction, the first display scenario as a scenario in which energy can be saved.

The enabling instruction herein includes an instruction used to enable or stop an operation of determining the first display scenario as a scenario in which energy can be saved. The enabling instruction may be entered by a user by using a hardware switch or a soft switch, or may be an enabling instruction generated adaptively. For example, a quantity of times that the user exits an application program after the display displays the at least one target image frame adapted is collected, where the application program herein is an application program that generates the first graphics frame. When the quantity of times is greater than a tolerance threshold, an enabling instruction used to stop executing the operation of determining the first display scenario as a scenario in which energy can be saved is generated.

In an embodiment, the central processing unit 601 may gradually reduce the graphics processing resolution of the GPU, to prevent the user from sensing that the resolution is changed suddenly.

In addition, a combination may be made between various technologies, systems, apparatuses, methods separately described in the foregoing embodiments and technical features separately described in the embodiments, so as to form another module, method, apparatus, system, and technology that do not depart from the spirit and principle of the present invention. The module, method, apparatus, system, and technology that are formed by means of a combination according to a record in the embodiments of the present invention shall fall within the protection scope of the present invention.

Apparently, a person skilled in the art should understand that the foregoing units or steps of the present invention may be implemented by a common computing apparatus. The units or steps may be integrated in a single computing apparatus or distributed in a network including multiple computing apparatuses. Optionally, the units or steps may be implemented by using program code that a computing apparatus can execute. Therefore, the units or steps may be stored in a storage apparatus and executed by the computing apparatus. Alternatively, the units or steps are separately made into various circuit modules, or multiple units or steps in the units or steps are made into a single circuit module for implementation. In this way, the present invention is not limited to any specific combination of hardware and software.

The foregoing is merely examples of embodiments of the present invention, but is not intended to limit the protection scope of the present invention. Any modification, equivalent replacement, or improvement made without departing from the spirit and principle of the present invention shall fall within the protection scope of the present invention.

What is claimed is:

1. A method for changing graphics processing resolution according to a scenario, comprising:
    determining a first display scenario, wherein the determining the first display scenario comprises:
        obtaining a first graphics frame sequence in the first display scenario;
        calculating an eigenvalue of the first graphics frame sequence, wherein a first graphics frame in a first model sequence is used as a first target graphics frame in the first graphics frame sequence, an eigenvalue of the first target graphics frame is used as the eigenvalue of the first graphics frame sequence, and the calculating the eigenvalue of the first graphics frame sequence comprises at least one of:
            calculating a thread eigenvalue of the first target graphics frame according to a thread required for rendering the first target graphics frame;
            calculating a model eigenvalue of the first target graphics frame according to a model array of the first target graphics frame;
            calculating an address eigenvalue of the first target graphics frame according to a buffer address of a model comprised in the first target graphics frame; or
            performing weighted summation on the thread eigenvalue, the model eigenvalue, and the address eigenvalue, to obtain the eigenvalue of the first target graphics frame; and
        determining a display scenario type of the first graphics frame sequence according to the eigenvalue of the first graphics frame sequence, wherein the display scenario type comprises one of a scenario in which a game is being played or a scenario in which no game is being played, and wherein the scenario in which a game is being played is a scenario in which energy can be saved;
    reducing graphics processing resolution of a graphics processor;
    rendering, by the graphics processor, at least one target graphics frame in the first display scenario according to the reduced graphics processing resolution, to obtain at least one target image frame;
    adapting the at least one target image frame according to screen display resolution; and
    displaying the at least one target image frame adapted.

2. The method according to claim 1, wherein the rendering, by the graphics processor, at least one graphics frame in the first display scenario according to the reduced graphics processing resolution comprises:
    setting a graphics processing global variable of the graphics processor according to the reduced graphics processing resolution; and
    rendering the at least one target graphics frame according to the graphics processing global variable.

3. The method according to claim 1, wherein after the displaying the at least one target image frame adapted, the method further comprises:
    collecting a quantity of times that a user exits an application program after the at least one target image frame is displayed, wherein the application program is an application program that generates the first graphics frame sequence; and
    when the quantity of times is greater than a tolerance threshold, stopping execution of determining a first display scenario as a scenario in which energy can be saved.

4. A portable electronic device, comprising at least one central processor, a graphics processor, a display adapter circuit, and a display, wherein
    the at least one central processor is configured to:
        determine a first display scenario, wherein the at least one central processor is configured to determine the first display scenario comprises the at least one central processor is configured to:
            obtain a first graphics frame sequence in the first display scenario;
            calculate an eigenvalue of the first graphics frame sequence, wherein a first graphics frame in a first model sequence is used as a first target graphics frame in the first graphics frame sequence, an eigenvalue of the first target graphics frame is used as the eigenvalue of the first graphics frame sequence, and the at least one central processor is configured to perform at least one of following operations:
    calculating a thread eigenvalue of the first target graphics frame according to a thread required for rendering the first target graphics frame;
    calculating a model eigenvalue of the first target graphics frame according to a model array of the first target graphics frame;
    calculating an address eigenvalue of the first target graphics frame according to a buffer address of a model comprised in the first target graphics frame; or
    performing weighted summation on the thread eigenvalue, the model eigenvalue, and the address eigenvalue, to obtain the eigenvalue of the first target graphics frame; and
determine a display scenario type of the first graphics frame sequence according to the eigenvalue of the first graphics frame sequence, wherein the display scenario type comprises one of a scenario in which a game is being played or a scenario in which no game is being played, and wherein the scenario in which a game is being played is a scenario in which energy can be saved; and
reduce graphics processing resolution of the graphics processor based on the determination;
the graphics processor is configured to render at least one target graphics frame in the first display scenario according to the reduced graphics processing resolution to obtain at least one target image frame;
the display adapter circuit is configured to adapt the at least one target image frame according to display resolution of the display; and
the display is configured to display the at least one adapted target image frame.

5. The portable electronic device according to claim 4, wherein the graphics processor is configured to:
    set a graphics processing global variable of the graphics processor according to the reduced graphics processing resolution; and
    render the at least one target graphics frame according to the graphics processing global variable.

6. The portable electronic device according to claim 4, wherein the determining the first display scenario comprises:
    determining, according to an enabling instruction, the first display scenario, wherein:
        the enabling instruction is used to enable or stop an operation of determining the first display scenario; and
        the at least one central processor is further configured to:
            collect a quantity of times that a user exits an application program after the display displays the at least one target image frame adapted, wherein the application program is an application program that generates the first graphics frame; and
            generate the enabling instruction used to stop executing the operation of determining the first display scenario in response to determining that the collected quantity of times is greater than a tolerance threshold.

7. A system, comprising at least one central processor and a graphics processor, wherein the at least one central processor is configured to:
    determine a first display scenario, wherein the at least one central processor is configured to determine the first display scenario comprises the at least one central processor is configured to:
        obtain a first graphics frame sequence in the first display scenario;
        calculate an eigenvalue of the first graphics frame sequence, wherein a first graphics frame in a first model sequence is used as a first target graphics frame in the first graphics frame sequence, an eigenvalue of the first target graphics frame is used as the eigenvalue of the first graphics frame sequence, and the at least one central processor is configured to perform at least one of following operations:
            calculating a thread eigenvalue of the first target graphics frame according to a thread required for rendering the first target graphics frame;
            calculating a model eigenvalue of the first target graphics frame according to a model array of the first target graphics frame;
            calculating an address eigenvalue of the first target graphics frame according to a buffer address of a model comprised in the first target graphics frame; or
            performing weighted summation on the thread eigenvalue, the model eigenvalue, and the address eigenvalue, to obtain the eigenvalue of the first target graphics frame; and
        determine a display scenario type of the first graphics frame sequence according to the eigenvalue of the first graphics frame sequence, wherein the display scenario type comprises one of a scenario in which a game is being played or a scenario in which no game is being played, and wherein the scenario in which a game is being played is a scenario in which energy can be saved; and
        reduce graphics processing resolution of the graphics processor in response to the determination; and
the graphics processor is configured to render at least one target graphics frame in the first display scenario according to the reduced graphics processing resolution to obtain at least one target image frame.

8. The system according to claim 7, wherein the determining the first display scenario comprises:
    determining, according to an enabling instruction, the first display scenario, wherein
    the enabling instruction is used to enable or stop an operation of determining the first display scenario; and
    the at least one central processor is further configured to:
        collect a quantity of times that a user exits an application program after a display displays the at least one target image frame adapted, wherein the application program is an application program that generates the first graphics frame; and
        generate the enabling instruction used to stop executing the operation of determining the first display scenario in response to determining that the collected quantity of times is greater than a tolerance threshold.

* * * * *